(12) United States Patent
Kuribayashi

(10) Patent No.: US 11,584,427 B2
(45) Date of Patent: Feb. 21, 2023

(54) STEERING DEVICE AND VEHICLE WHEEL MOUNTING MODULE INCLUDING THE SAME

(71) Applicant: TOYOTA JIDOSHA KABUSHIKI KAISHA, Toyota (JP)

(72) Inventor: Takuya Kuribayashi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 561 days.

(21) Appl. No.: 16/697,480

(22) Filed: Nov. 27, 2019

(65) Prior Publication Data
US 2020/0207405 A1 Jul. 2, 2020

(30) Foreign Application Priority Data
Dec. 27, 2018 (JP) .............................. JP2018-245243

(51) Int. Cl.
| | | |
|---|---|---|
| *B62D 5/04* | (2006.01) | |
| *B62D 7/18* | (2006.01) | |
| *B60K 7/00* | (2006.01) | |
| *B60G 15/06* | (2006.01) | |
| *B60G 3/18* | (2006.01) | |

(52) U.S. Cl.
CPC .............. *B62D 5/046* (2013.01); *B60G 3/18* (2013.01); *B60G 15/06* (2013.01); *B60K 7/0007* (2013.01); *B62D 7/18* (2013.01)

(58) Field of Classification Search
CPC ........ B62D 5/046; B62D 7/18; B62D 5/0418; B60G 3/18; B60G 15/06; B60G 2200/144; B60G 2200/44; B60G 2204/419; B60G 2300/50; B60G 3/20; B60G 7/006; B60G 7/02; B60K 7/0007; B60K 11/06; B60K 11/08; B60K 17/043; B60K 2007/0038; B60K 2007/0092; B60Y 2200/221
See application file for complete search history.

(56) References Cited

U.S. PATENT DOCUMENTS

| | | | | |
|---|---|---|---|---|
| 4,877,098 A | * | 10/1989 | Asanuma | B62D 5/0418 180/444 |
| 2007/0045036 A1 | * | 3/2007 | Takeuchi | B62D 5/0418 280/124.145 |
| 2009/0057050 A1 | * | 3/2009 | Shiino | B62D 7/18 180/444 |
| 2017/0137059 A1 | * | 5/2017 | Oh | B62D 3/126 |

(Continued)

FOREIGN PATENT DOCUMENTS

| | | |
|---|---|---|
| CN | 106660583 A | 5/2017 |
| JP | 8-119141 A | 5/1996 |

(Continued)

*Primary Examiner* — Darlene P Condra
(74) *Attorney, Agent, or Firm* — Sughrue Mion, PLLC

(57) ABSTRACT

A steering device, including: a steering knuckle rotatably holding a wheel; an electric motor and a speed reducer configured to decelerate rotation of the electric motor, the electric motor and the speed reducer being fixed to a suspension arm; and a joint through which the steering knuckle is supported by the suspension arm in a state in which a kingpin axis is allowed to incline with respect to the suspension arm, the joint coupling the steering knuckle and an output shaft of the speed reducer such that the steering knuckle pivots about the kingpin axis by an operation of the electric motor.

5 Claims, 5 Drawing Sheets

(56) References Cited

U.S. PATENT DOCUMENTS

2018/0093707 A1* 4/2018 Tokioka ............... B62D 5/0418
2019/0047610 A1* 2/2019 Rey ........................ F16H 1/32

FOREIGN PATENT DOCUMENTS

| JP | 2005145229 A | * | 6/2005 |
| JP | 2006-349091 A | | 12/2006 |
| JP | 2008-168803 A | | 7/2008 |
| JP | 2009-51376 A | | 3/2009 |
| JP | 2013-52766 A | | 3/2013 |
| JP | 2014-169745 A | | 9/2014 |

* cited by examiner

FIG.5A
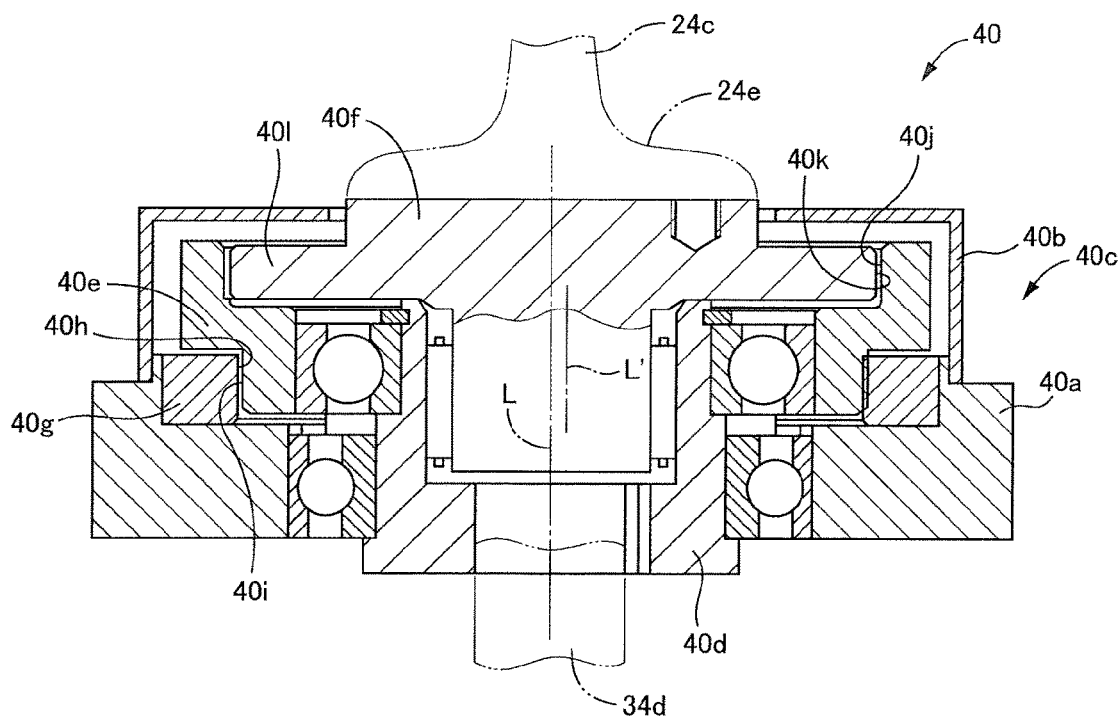
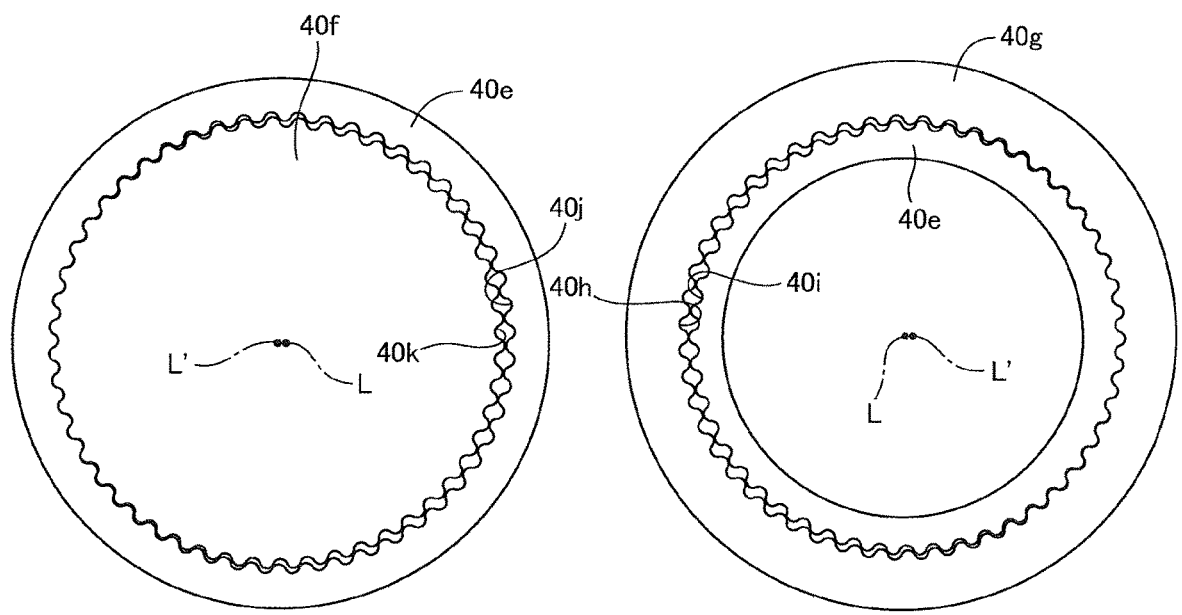
FIG.5C          FIG.5B

STEERING DEVICE AND VEHICLE WHEEL MOUNTING MODULE INCLUDING THE SAME

CROSS REFERENCE TO RELATED APPLICATION

The present application claims priority from Japanese Patent Application No. 2018-245243, which was filed on Dec. 27, 2018, the disclosure of which is herein incorporated by reference in its entirety.

BACKGROUND

Technical Field

The following disclosure relates to a steering device configured to steer a wheel and a wheel mounting module for a vehicle which includes the steering device as a constituent element and through which the wheel is mounted on the vehicle.

Description of Related Art

A steering device configured to steer only one of a plurality of wheels of a vehicle, namely, a steering device configured to steer only one of right and left wheels, may be referred to as a single-wheel steering device. For instance, Japanese Patent Application Publication No. 2014-169745 discloses a steering device as the single-wheel steering device. The disclosed steering device is configured such that a steering knuckle is supported by a suspension arm, specifically, by an upper arm, via a speed reducer configured to transmit a steering force.

SUMMARY

The single-wheel steering device described above is still under development and have various disadvantages. In the disclosed steering device, the output shaft of the speed reducer and the steering knuckle are rigidly coupled, so that inclination of the kingpin axis with respect to the upper arm caused by a bound/rebound movement of the wheel may adversely influence smooth steering. The speed reducer of the disclosed steering device includes a speed reduction mechanism constituted by a face gear and a pinion, and the efficiency is not necessarily high. For obtaining a high reduction ratio, namely, a high ratio of the rotation speed of the input shaft to the rotation speed of the output shaft, the face gear needs to have a larger diameter, inevitably increasing the size of the steering device. To rotate the face gear, a pinion is driven and rotated. A drive source (e.g., an electric motor) for driving and rotating the pinion needs to be disposed radially outwardly of the face gear whose axis coincides with the kingpin axis. This also contributes to the size increase of the steering device. In other words, the steering device inevitably has an increased size in a direction orthogonal to the kingpin axis. Thus, there remains much room for improvement in the single-wheel steering device, and some modifications can enhance the utility of the single-wheel steering device. Accordingly, one aspect of the present disclosure is directed to a steering device having high utility. Another aspect of the present disclosure is directed to a vehicle wheel mounting module having high utility owing to employment of the steering device.

In a first aspect of the present disclosure, a steering device includes:

a steering knuckle rotatably holding a wheel;

an electric motor and a speed reducer configured to decelerate rotation of the electric motor, the electric motor and the speed reducer being fixed to a suspension arm; and a joint through which the steering knuckle is supported by the suspension arm in a state in which a kingpin axis is allowed to incline with respect to the suspension arm, the joint coupling the steering knuckle and an output shaft of the speed reducer such that the steering knuckle pivots about the kingpin axis by an operation of the electric motor.

In a second aspect of the present disclosure, a wheel mounting module for a vehicle includes:

a base to be installed on a body of the vehicle;

a first suspension arm as the suspension arm, a proximal end portion of the first suspension arm being pivotally supported by the base;

the steering device constructed as described above;

a second suspension arm a proximal end portion of which is pivotally supported by the base, the second suspension arm being coupled to the steering knuckle through another joint;

a suspension spring and a shock absorber disposed in parallel with each other, the suspension spring and the shock absorber coupling the base and one of the first suspension arm and the second suspension arm; and a wheel drive unit disposed inside a rim of the wheel and including a drive motor for driving the wheel, a housing of the wheel drive unit functioning as the steering knuckle.

In the steering device of the present disclosure, the output shaft of the speed reducer is coupled to the steering knuckle through the joint, and the steering knuckle is pivoted by a rotational force of the output shaft of the speed reducer transmitted via the joint, so that the wheel is steered. The speed reducer is fixed to the suspension arm, and the output shaft of the speed reducer is prohibited from inclining with respect to the suspension arm. On the other hand, the steering knuckle needs to incline with respect to the suspension arm in the bound/rebound movement of the wheel. This inclination of the steering knuckle is allowed by the joint in the present steering device. Thus, even though the steering device includes the speed reducer that is fixed to the suspension arm, the steering device enables smooth steering of the wheel. Accordingly, the single-wheel steering device having high utility can be constructed.

In the vehicle wheel mounting module of the present disclosure, not only a wheel driving and rotating device and the suspension device, but also the steering device is modularized. Thus, installation of the module on the vehicle body enables easy construction of chassis. Further, the present vehicle wheel mounting module enjoys advantages of the steering device constructed as described above, namely, the advantages of smooth steering of the wheel, so that the vehicle wheel mounting module having high utility can be constructed.

BRIEF DESCRIPTION OF THE DRAWINGS

The objects, features, advantages, and technical and industrial significance of the present disclosure will be better understood by reading the following detailed description of an embodiment, when considered in connection with the accompanying drawings, in which:

FIG. 5A is a cross-sectional view of a speed reduction mechanism employable in the steering device of FIG. 1 in place of the speed reduction mechanism of FIGS. 3A and 3B, the view taken along a plane including an axis of the speed reduction mechanism; and FIGS. 5B and 5C are schematic views of the speed reduction mechanism of FIG. 5A seen in the axial direction.

Figure 1:
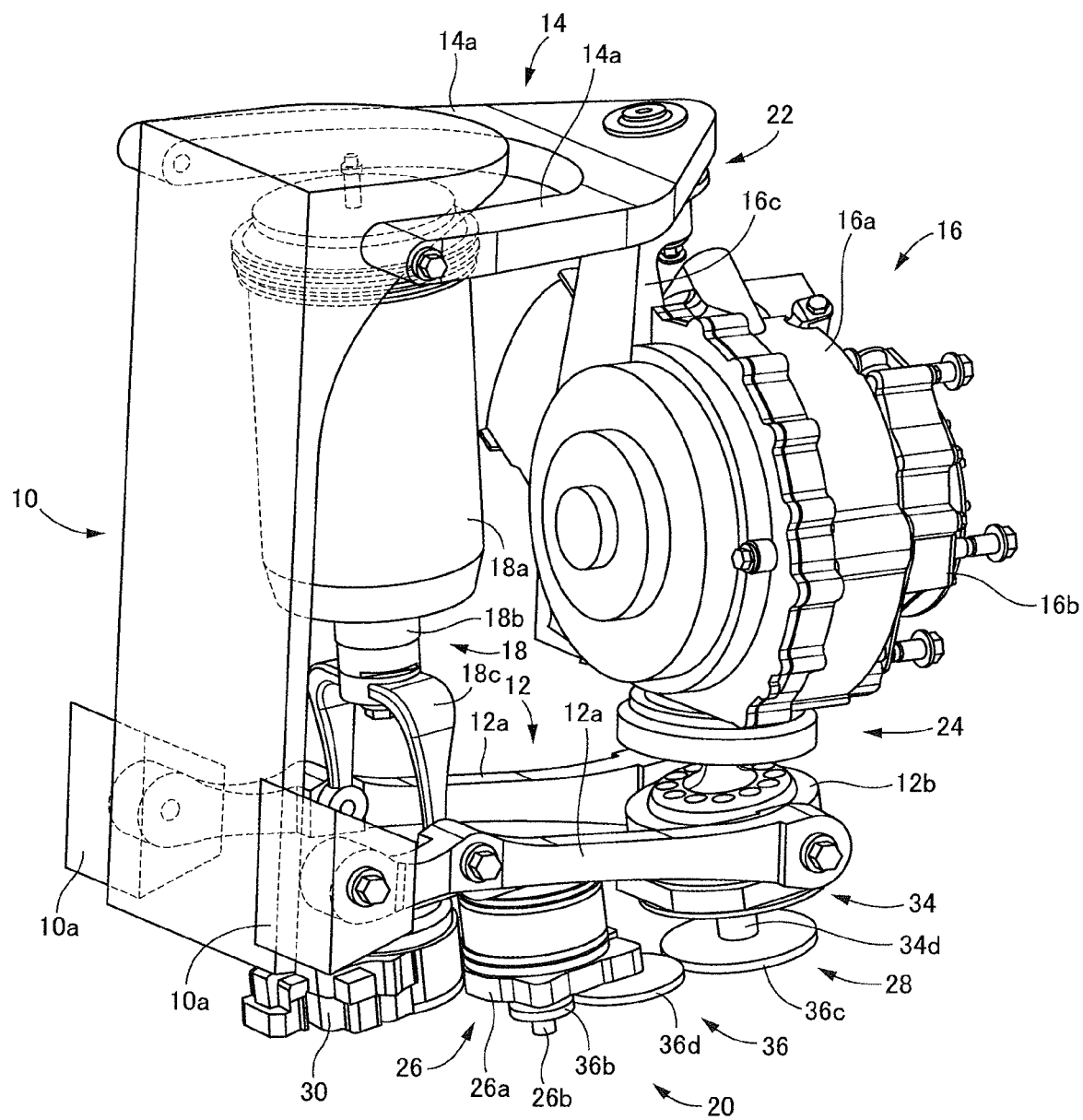
FIG. 1 is a perspective view of a steering device and a vehicle wheel mounting module including the steering device, according to one embodiment of the present disclosure.

VARIOUS FORMS OF STEERING DEVICE AND VEHICLE WHEEL MOUNTING MODULE ACCORDING TO PRESENT DISCLOSURE

The type of the suspension device to which is applied the steering device of the present disclosure is not limited to any particular one. In other words, the "suspension arm" in the present steering device may be a suspension arm employed in any type of suspension device. Specifically, the suspension arm may be a lower arm in a MacPherson type suspension device or may be an upper arm or a lower arm in a double wishbone type suspension device or a multi-link type suspension device.

A flexible joint such as a universal joint is employable as the "joint" in the steering device of the present disclosure. It is, however, desirable to employ a joint that does not cause a change in torque due to a change in rotational phase when an input shaft and an output shaft of the joint incline relative to each other. That is, a constant velocity joint is desirably employed. The constant velocity joint enables smoother steering. As the constant velocity joint, a tripod constant velocity joint is desirably employed. The tripod constant velocity joint is a sliding type joint and has a certain degree of compliance, thus ensuring smoother steering of the wheel and smoother operation of the suspension device.

The "speed reducer" in the present steering device preferably includes a speed reduction mechanism in which an output shaft and an input shaft thereof are coaxially disposed and which has a reduction ratio of not less than 50. The reduction ratio is a ratio of the rotation speed of the input shaft to the rotation speed of the output shaft. That is, it is preferable that the speed reducer include a coaxial high reduction mechanism. Employment of the coaxial high reduction mechanism enables the electric motor to be downsized and enables an installation space of the speed reducer on the suspension arm to be relatively small. There may be employable, as the coaxial high reduction mechanism, a differential mechanism of an internally-meshing gear type such as a cycloid speed reduction mechanism or a harmonic gear mechanism (flexspline speed reduction mechanism) such as what is called HarmonicDrive® mechanism. The speed reducer employed in the steering device of the present disclosure may be a multistage speed reducer including, in addition to the coaxial high reduction mechanism described above, other speed reduction mechanism constituted by a gear train, a belt and pulleys, or the like.

In the steering device of the present disclosure, the speed reducer and the electric motor may be disposed such that an output shaft of the speed reducer and a motor shaft of the electric motor (rotation shaft) are not coaxial but parallel to each other. This arrangement reduces the size of the steering device in a direction of extension of the kingpin axis, generally, in the up-down direction.

The wheel mounting module of the present disclosure enables the wheel to be held by the vehicle body and enables a plurality of necessary functions in relation to the wheel to be achieved in one unit, the functions including a wheel driving and rotating function, a wheel steering function, and a vehicle body suspension function. That is, the wheel driving and rotating device, the wheel steering device, and the suspension device are modularized as one package. It is preferable that a brake device be further incorporated into the module for attaining a wheel braking function.

The wheel mounting module of the present disclosure may incorporate what is called double wishbone type suspension device, for instance. In the thus constructed module, the electric motor and the speed reducer may be fixed to one of the lower arm and the upper arm, and the steering knuckle may be coupled to the other of the lower arm and the upper arm through a joint, such as a ball joint, that does not require power transmission.

The "wheel drive unit" in the wheel mounting module of the present disclosure is what is called in-wheel motor unit and may be constituted by the electric motor, the speed reducer, etc. The housing of the wheel drive unit serves as the steering knuckle, so that the wheel mounting module that is compact in size can be constructed.

DETAILED DESCRIPTION OF THE EMBODIMENT

Referring to the drawings, there will be explained below in detail a steering device according to one embodiment of the present disclosure and a vehicle wheel mounting module including the steering device. It is to be understood that the present disclosure is not limited to the details of the following embodiment but may be embodied based on the forms described in Various Forms and may be changed and modified based on the knowledge of those skilled in the art.

Figure 2:
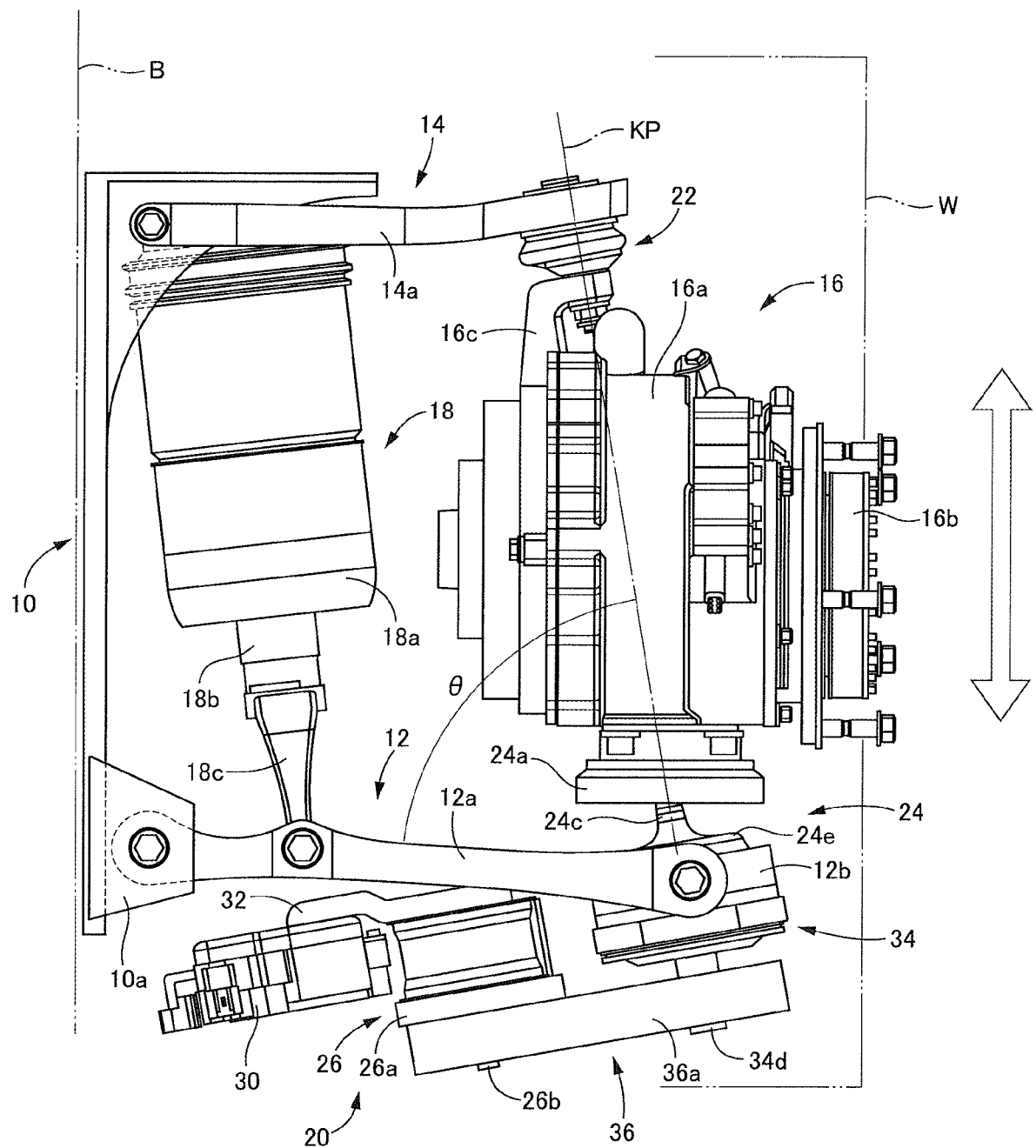
FIG. 2 is a view of the steering device and the vehicle wheel mounting module of FIG. 1, the view seen from a front side of the vehicle.

As shown in FIGS. 1 and 2, the vehicle wheel mounting module according to the present embodiment includes: a base 10 having a rear surface to which is attached a vehicle body B (indicated by the long dashed double-short dashed line in FIG. 2); a lower arm 12, as a first suspension arm, pivotally supported at a proximal end portion thereof by a lower end portion of the base 10; an upper arm 14, as a second suspension arm, pivotally supported at a proximal end portion thereof by an upper end portion of the base 10; a wheel drive unit 16 which is pivotally held between a distal end portion of the lower arm 12 and a distal end portion of the upper arm 14, a housing of which serves as a steering knuckle, and which is configured to drive and rotate a wheel W that the wheel drive unit 16 holds (indicated by the long dashed double-short dashed line in FIG. 2); a spring and absorber assembly 18 disposed so as to connect the base 10 and an intermediate portion of the lower arm 12; and a steering device 20 according to the present embodiment configured to steer the wheel by pivotally moving the wheel drive unit 16. While not shown, the housing of the wheel drive unit 16 also holds a brake caliper. Further, the housing of the wheel drive unit 16 holds a brake disc with the wheel. Thus, the wheel mounting module also incorporates a disc brake device.

As apparent from the structure described above, the wheel mounting module according to the present embodiment achieves, by one unit, the wheel driving and rotating function, the wheel steering function, the vehicle body suspension function, and the wheel braking function. It is accordingly considered that the wheel driving and rotating device, the wheel steering device, the suspension device, and the brake device are modularized, namely, are formed into one module. Thus, the present wheel mounting module is excellent in that it can construct a chassis simply by being installed on the vehicle body. It is noted that the suspension device in the present embodiment is a double wishbone type suspension device.

The lower arm 12 is divided into two arm portions 12a and a connecting portion 12b that connects distal ends of the two arm portions 12a. A speed reduction mechanism (that will be explained) of the steering device 20, specifically, a housing of the speed reduction mechanism, serves as the connecting portion 12b. The distal ends of the respective two arm portions 12a and the connecting portion 12b are fastened to each other by bolts, so that the two arm portions 12a and the connecting portion 12b are integrated. In other words, the speed reduction mechanism is fastened to the distal ends of the respective arm portions 12a by the bolts. Proximal ends of the respective two arm portions 12a are rotatably supported, through respective bushings, by a pair of brackets 10a provided at the lower end portion of the base 10, such that the two arm portions 12a, namely, the lower arm 12, is pivotable.

The upper arm 14 is shaped such that two arm portions 14a are integrated at distal ends thereof. In other words, the upper arm 14 is bifurcated on its proximal end side so as to provide the two arm portions 14a. Proximal ends of the respective two arm portions 14a are rotatably supported by the upper end portion of the base 10 through respective bushings, such that the upper arm 14 is pivotable.

The wheel drive unit 16 incorporates, in its housing 16a, a wheel drive motor that is an electric motor and a speed reducer for decelerating rotation of the motor. The wheel drive unit 16 includes an axle hub 16b supported by the housing 16a through a bearing. An output shaft of the speed reducer is coupled to the axle hub 16b. The wheel W is attached to the axle hub 16b by hub bolts together with a disc rotor of the brake device. That is, the wheel drive unit 16 is configured such that the housing 16a rotatably holds the wheel W.

The housing 16a has a bracket 16c protruding upward and is coupled at an upper end of the bracket 16c to the distal end of the upper arm 14 through a ball joint 22. The housing 16a is coupled at a lower end thereof to the connecting portion 12b as the distal end of the lower arm 12, that is, the housing 16a is coupled to the speed reduction mechanism that serves as the connecting portion 12b, through a tripod joint 24 that is a constant velocity joint. A line connecting the center of the ball joint 22 and the center of the tripod joint 24 is a king pin axis KP. The housing 16a of the wheel drive unit 16 pivots about the king pin axis KP. Thus, the housing 16a functions as the steering knuckle.

The spring and absorber assembly 18 will be briefly explained. The spring and absorber assembly 18 includes an air spring 18a as a suspension spring and a hydraulic shock absorber 18b that are formed as a unit. The spring and absorber assembly 18 is supported at an upper end thereof by the upper end portion of the base 10 functioning as a mount portion through a mount rubber. The spring and absorber assembly 18 is coupled at a lower end thereof to the lower arm 12, specifically, to the longitudinally intermediate portions of the respective arm portions 12a via a yoke 18c by respective bushings. The spring and absorber assembly 18 is configured to receive, via the air spring 18a, a load of the vehicle body B that the spring and absorber assembly 18 should receive. The bound/rebound movement of the wheel W causes the lower arm 12 and the upper arm 14 to pivot, and the pivotal movement of the lower arm 12 causes the spring and absorber assembly 18 to extend and contract. The shock absorber 18b generates a damping force with respect to the extension and contraction, namely, a damping force with respect to the bound/rebound movement of the wheel W.

The steering device 20 includes an electric motor 26, a speed reducer 28, and an electronic control unit (ECU) 30 as a controller of the electric motor 26. The electric motor 26 is a brushless DC motor. A motor shaft 26b of the electric motor 26 extends generally downward from a motor body 26a. The electric motor 26 is fastened to the lower arm 12 by a fastening member (not shown). The ECU 30 is attached to the motor body 26a by a mounting bracket 32 and includes a computer and an inverter that is a driver of the electric motor 26. The speed reducer 28 is constituted by two speed reduction mechanisms, i.e., a first speed reduction mechanism 34 and a second speed reduction mechanism 36.

Figure 3A:
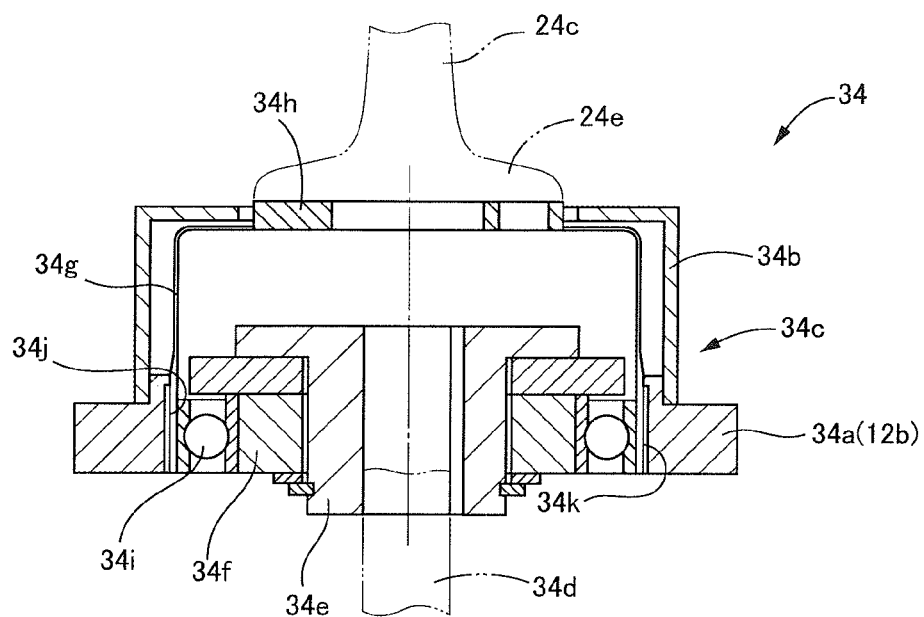
FIG. 3A is a cross-sectional view of a speed reduction mechanism of the steering device illustrated in FIG. 1.
Figure 3B:
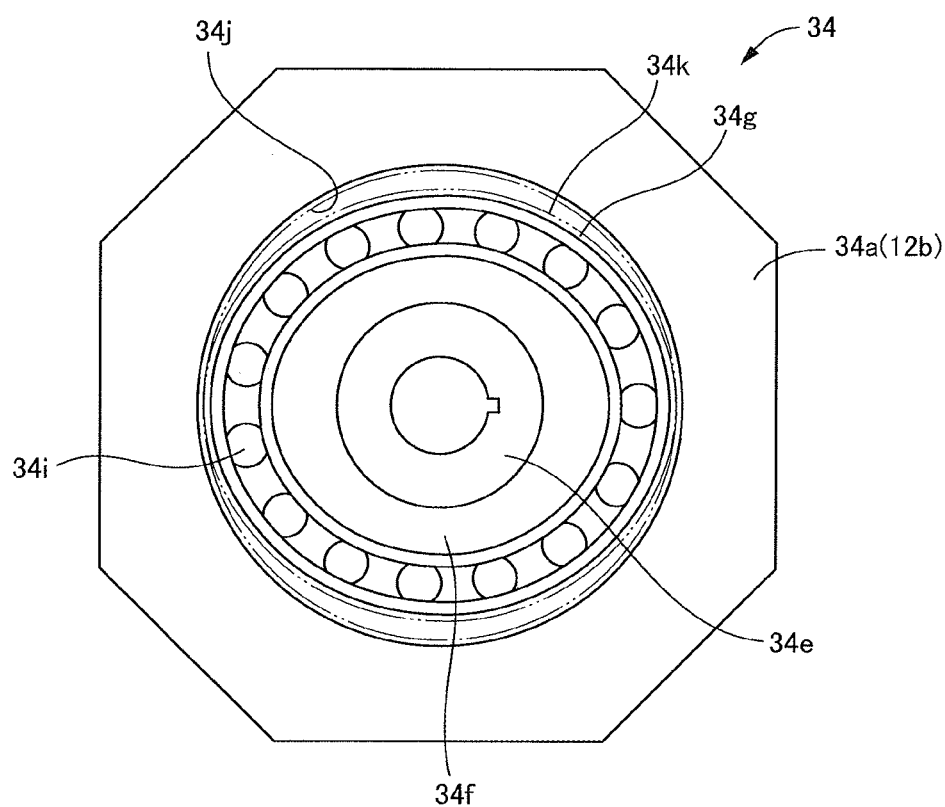
FIG. 3B is a bottom view of the speed reduction mechanism of the steering device illustrated in FIG. 1.

The first speed reduction mechanism 34 corresponds to the speed reduction mechanism explained above with respect to the lower arm 12. As explained above, a housing 34c of the speed reduction mechanism 34 serves as the connecting portion 12b of the lower arm 12. As shown in a cross-sectional view of FIG. 3A and a bottom view of FIG. 3B, the first speed reduction mechanism 34 is a harmonic gear mechanism (which may be also referred to as "HarmonicDrive®" mechanism). The first speed reduction mechanism 34 includes the housing 34c constituted by a base 34a and a cover 34b. In a strict sense, the base 34a serves as the connecting portion 12b of the lower arm 12.

The harmonic gear mechanism is well known, and the first speed reduction mechanism 34 will be briefly explained. A rotating plate 34f whose outer periphery has an oval shape is fitted on a main shaft 34e into which an input shaft 34d is fitted. The main shaft 34e rotates with the input shaft 34d. The first speed reduction mechanism 34 has, in the cover 34b, a cup-like flexible member 34g that is comparatively thin and substantially flexible. A disc-like output shaft 34h is attached to a central portion of the bottom of the flexible member 34g, that is, the output shaft 34h is attached to an upper end of the flexible member 34g. A flexible radial bearing 34i is fitted on an outer periphery of the rotating plate 34f, and a rim of the flexible member 34g is mounted on an outer periphery of the radial bearing 34i. A fine internal gear 34j is formed on an inner circumferential portion of the base 34a that defines a hole. An external gear 34k, whose number of teeth is smaller than that of the internal gear 34j by two, is formed on an outer circumferential portion of the rim of the flexible member 34g. The internal gear 34j and the external gear 34k are in mesh with each other. Because the rotating plate 34f has an oval shape, however, the internal gear 34j and the external gear 34k are in mesh with each other only at two positions that are apart from each other by 180° in the circumferential direction. When the input shaft 34d is rotated, each of the two meshing positions of the internal gear 34j and the external gear 34k changes by an amount corresponding to two teeth per one rotation of the input shaft 34d, and the flexible member 34g is rotated in accordance with the change of the meshing positions.

Here, a ratio of the rotation speed of the input shaft 34d to the rotation speed of the output shaft 34h is defined as a reduction ratio. The reduction ratio of the first speed reduction mechanism 34 is not less than 50. In the first speed reduction mechanism 34, the input shaft 34d and the output shaft 34h are coaxially disposed, and the reduction ratio is large. Thus, the first speed reduction mechanism 34 is constructed as a coaxial high reduction mechanism. In other words, the first speed reduction mechanism 34 is constructed such that the portion of the base 34a on which the internal gear 34j is formed functions as a circular spline, the portion of the flexible member 34g on which the external gear 34k is formed functions as a flexspline, and the combination of the oval rotating plate 34f, the radial bearing 34i, and the main shaft 34e functions as a wave generator. As later explained, a flange portion of a shaft of the tripod joint 24 is coupled to the output shaft 34h. For the sake of simplifying the explanation, a bearing structure for receiving a thrust load in the first speed reduction mechanism 34 is not illustrated, but the first speed reduction mechanism 34 actually has the bearing structure.

The second speed reduction mechanism 36 is configured to decelerate rotation of the motor shaft 26b of the electric motor 26 and to transmit the decelerated rotation to the input shaft 34d of the first speed reduction mechanism 34. The electric motor 26 and the first speed reduction mechanism 34 are disposed such that the motor shaft 26b and the input shaft 34d are parallel to each other. As shown in FIG. 2, the second speed reduction mechanism 36 includes a cover 36a supported by the motor body 26a. In FIG. 1, the cover 36a is removed from the second speed reduction mechanism 36. The second speed reduction mechanism 36 includes a gear train constituted by an input-side gear 36b attached to the motor shaft 26b, an output-side gear 36c attached to the input shaft 34d of the first speed reduction mechanism 34, and an intermediate gear 36d supported by the cover 36a and meshing with the input-side gear 36b and the output-side gear 36c. The reduction ratio of the second speed reduction mechanism 36, namely, the ratio of the rotation speed of the motor shaft 26b of the electric motor 26 to the rotation speed of the input shaft 34d of the first speed reduction mechanism 34, is made equal to about 3.

Figure 4A:
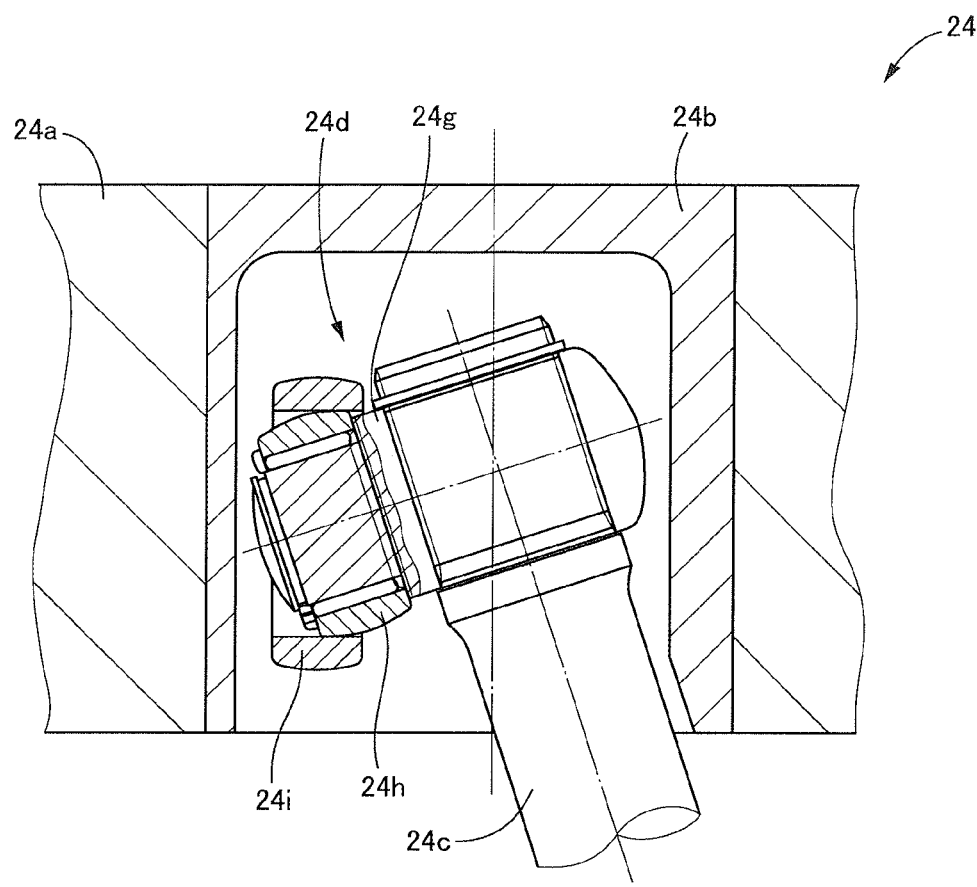
FIG. 4A is a cross-sectional view of a tripod joint of the steering device illustrated in FIG. 1, the view taken along a plane including an axis of the tripod joint.
Figure 4B:
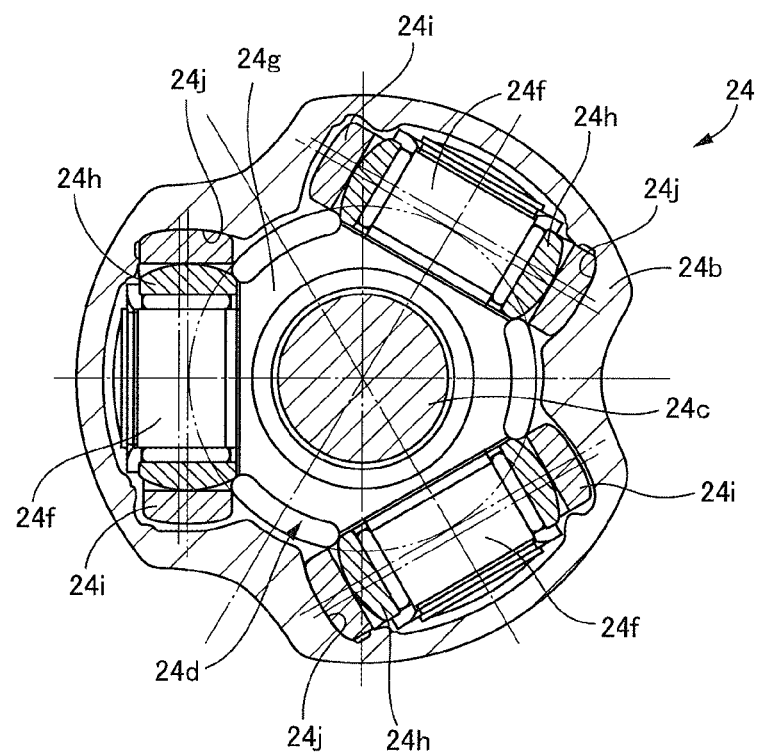
FIG. 4B is a cross-sectional view of the tripod joint of the steering device illustrated in FIG. 1, the view taken along a plane perpendicular to the axis of the tripod joint.

The tripod joint 24 that is the constant velocity joint has a known structure. The tripod joint 24 will be briefly explained referring to FIGS. 4A and 4B. FIG. 4A is a cross-sectional view taken along a plane including an axis of the tripod joint 24, and FIG. 4B is a cross-sectional view taken along a plane perpendicular to the axis. The tripod joint 24 includes a seat member 24a on which the wheel drive unit 16 is mounted, a cup-like casing 24b fitted in the seat member 24a, a shaft 24c extending downward from an inside of the casing 24b, and a roller assembly 24d attached to an upper end of the shaft 24c in the casing 24b. As explained above, the shaft 24c has, at a lower end thereof, a flange portion 24e (FIG. 2) that is coupled to the output shaft 34h of the first speed reduction mechanism 34.

The roller assembly 24d is constituted by: a tripod member 24g including three trunnions 24f and fitted on the shaft 24c; and three double-roller pairs each of which is supported by a corresponding one of the three trunnions 24f and each of which is constituted by an inner roller 24h and an outer roller 24i. Three guide grooves 24j are formed in the casing 24b so as to be in parallel with an axis of the casing 24b. The three double-roller pairs slide in the corresponding guide grooves 24j such that the outer roller 24i of each pair rolls on a wall surface of the corresponding guide groove 24j. According to this configuration, the tripod joint 24 can transmit rotation smoothly at a constant velocity even though the axis of the casing 24b and the axis of the shaft 24c are inclined relative to each other. Even if the inclination angle defined by these axes changes, the rotation can be transmitted smoothly at a constant velocity.

In the present wheel mounting module (hereinafter simply referred to as "module" where appropriate), namely, in the present steering device 20, the electric motor 26 is rotated under the control of the ECU 30, so that the wheel drive unit 16 functioning as the steering knuckle is pivoted via the speed reducer 28 and the tripod joint 24. The pivotal movement of the wheel drive unit 16 causes the wheel W to be steered. In the present module, when the wheel W bounds and rebounds, a relative inclination angle θ of the wheel drive unit 16 and the lower arm 12 changes as schematically illustrated in FIG. 2. That is, the king pin axis KP inclines with respect to the lower arm 12. The present module, namely, the present steering device 20, is constructed such that the wheel drive unit 16 and the output shaft 34h of the first speed reduction mechanism 34 as the output shaft of the speed reducer 28 are coupled to each other by the tripod joint 24, so that smooth steering of the wheel W is ensured when the wheel W bounds and rebounds.

Further, in the present module, namely, in the present steering device 20, the speed reducer 28 includes the first speed reduction mechanism 34 as the coaxial high reduction mechanism. Thus, even though the electric motor 26 and the speed reducer 28 are fixed to the lower arm 12 that is the suspension arm, the steering device 20 is relatively compact in size and can be disposed in an inside space of a rim of the wheel W.

Modification

In the illustrated embodiment, the first speed reduction mechanism 34 that is the coaxial high reduction mechanism is employed in the steering device 20. For instance, a speed reduction mechanism 40 shown in FIGS. 5A and 5B may be employed as the coaxial high reduction mechanism. FIG. 5A is a cross-sectional view of the speed reduction mechanism 40 taken along a plane including its axis. The speed reduction mechanism 40 includes: a housing 40c functioning as the connecting portion 12b of the lower arm 12 and including a generally annular base 40a and a cover 40b; a main shaft 40d which is supported by the base 40a through a radial bearing and into which the input shaft 34d is fitted; a planetary gear member 40e supported by the main shaft 40d through a radial bearing; an output shaft 40f supported by the main shaft 40d via rollers; and a ring gear member 40g fixed to the base 40a.

Referring to schematic views of FIGS. 5B and 5C seen in the axial direction, a first internal gear 40h is formed on the ring gear member 40g, and a first external gear 40i, a part of which is in mesh with a part of the first internal gear 40h, is formed at a radially outer portion of the planetary gear member 40e. Further, a second internal gear 40j is formed at the radially outer portion of the planetary gear member 40e so as to be arranged side by side with the first external gear 40i in the axial direction, and a second external gear 40k, a part of which is in mesh with a part of the second internal gear 40j, is formed at a radially outer portion of the flange portion 401 of the output shaft 40f.

The portion of the main shaft 40d that supports the planetary gear member 40e has an axis L' that is eccentric with respect to an axis L of the main shaft 40d. Hereinafter, the portion will be referred to as an eccentric portion, and the axis L' will be referred to as an eccentric axis L'. The center of the first internal gear 40h lies on the axis L while the center of the first external gear 40i lies on the eccentric axis L'. The center of the second internal gear 40j lies on the eccentric axis L' while the center of the second external gear 40k lies on the axis L. The meshing position of the first internal gear 40h and the first external gear 40i is located opposite to the meshing position of the second internal gear 40j and the second external gear 40k with respect to the axis L or the eccentric axis L'. That is, those meshing positions are different from each other in phase by 180° in the circumferential direction. In other words, the speed reduction mechanism 40 is a differential mechanism of an internally-meshing gear type including: a first internally meshing planetary gear mechanism constituted by the first internal gear 40h and the first external gear 40i that is meshing internally with the first internal gear 40h; and a second internally meshing planetary gear mechanism constituted by the second internal gear 40j and the second external gear 40k that is meshing internally with the second internal gear 40j.

The first internal gear 40h has a circular arc tooth profile, and the first external gear 40i has an epitrochoid parallel curve tooth profile. Similarly, the second internal gear 40j has a circular arc tooth profile, and the second external gear 40k has an epitrochoid parallel curve tooth profile. Thus, the speed reduction mechanism 40 is constructed as a cycloid speed reducer. In the speed reduction mechanism 40, the number of teeth of the first internal gear 40h and the number of teeth of the first external gear 40i differ from each other only by one, and the number of teeth of the second internal gear 40j and the number of teeth of the second external gear 40k differ from each other only by one. As a result, the speed reduction mechanism 40 is constructed as a speed reduction mechanism having a high reduction ratio. It is noted that the reduction ratio is not less than 50 as in the first speed reduction mechanism 34 explained above. The cycloid speed reducer and the differential mechanism of the internally-meshing gear type are known in the art. Accordingly, the bearing structure for receiving the thrust load in the speed reduction mechanism 40 is not explained for the sake of brevity, but the speed reduction mechanism 40 actually has the bearing structure.

In the module of the illustrated embodiment, the steering device 20 of the illustrated embodiment is provided on the lower arm 12. The steering device may be provided on the upper arm 14. Specifically, the electric motor and the speed reducer may be fixed to the upper arm 14, and the output shaft of the speed reducer may be coupled to the housing 16a of the wheel drive unit 16 functioning as the steering knuckle through a joint similar to the tripod joint 24. The module of the illustrated embodiment incorporates the double wishbone type suspension device. The module may incorporate a MacPherson type suspension device in which the steering device of the present disclosure is provided on the lower arm, for instance. That is, the steering device of the present disclosure is applicable to various types of suspension device including the double wishbone type suspension device and the MacPherson type suspension device.

What is claimed is:

1. A wheel mounting module for a vehicle, comprising:
a base to be installed on a body of the vehicle;
a first suspension arm, a proximal end portion of which is pivotally supported by the base;
a steering device comprising:
(a) a steering knuckle rotatably holding a wheel,
(b) an electric motor and a speed reducer configured to decelerate rotation of the electric motor, the electric motor and the speed reducer being fixed to the first suspension arm, and
(c) a joint through which the steering knuckle is supported by the first suspension arm in a state in which a kingpin axis is allowed to incline with respect to the first suspension arm, the joint coupling the steering knuckle and an output shaft of the speed reducer such that the steering knuckle pivots about the kingpin axis by an operation of the electric motor;
a second suspension arm, a proximal end portion of which is pivotally supported by the base, the second suspension arm being coupled to the steering knuckle through another joint;
a suspension spring and a shock absorber disposed in parallel with each other, the suspension spring and the shock absorber coupling the base and one of the first suspension arm and the second suspension arm; and
a wheel drive unit disposed inside a rim of the wheel and including a drive motor for driving the wheel, a housing of the wheel drive unit functioning as the steering knuckle.

2. The wheel mounting module according to claim 1, wherein the joint is a constant velocity joint.

3. The wheel mounting module according to claim 2, wherein the constant velocity joint is a tripod constant velocity joint.

4. The wheel mounting module according to claim 1, wherein the speed reducer comprises a speed reduction mechanism that comprises an input shaft disposed coaxially with the output shaft, and wherein the speed reduction mechanism has a reduction ratio of not less than 50, the reduction ratio being a ratio of a rotation speed of the input shaft to a rotation speed of the output shaft.

5. The wheel mounting module according to claim 4, wherein the speed reduction mechanism is one from among a differential mechanism of an internally-meshing gear type and a harmonic gear mechanism.

* * * * *